United States Patent Office 3,507,856
Patented Apr. 21, 1970

3,507,856
PURIFICATION OF CAPROLACTAM OBTAINED BY NITROSATION OF CYCLOHEXYL COMPOUNDS
Francesco Siclari, Cesano Maderno, Giuseppe Messina, Limbiate, and Edgardo Horak, Seveso, Italy, assignors to SNIA Viscosa Societa Nazionale Industria Applicazioni Viscose S.p.A., Milan, Italy, a company of Italy
No Drawing. Filed July 19, 1967, Ser. No. 654,384
Claims priority, application Italy, July 27, 1966, 17,414/66
Int. Cl. C07d 41/06
U.S. Cl. 260—239.3
4 Claims

ABSTRACT OF THE DISCLOSURE

In the purification of caprolactam from nitrosation of cyclohexylic compounds and including amide-type volatile bases as impurities therefor, processing the impure caprolactam with a halogen and an alkaline agent to transform said amide-type volatile bases into amine compounds, and then remove said compound from the caprolactam.

---

The object of the present invention is an improvement in the process for purifying crude caprolactam obtained by nitrosation of cyclohexylic compounds. More particularly, the present invention relates to an improved process for the purification of crude caprolactam obtained as briefly described hereinbelow.

The production of caprolactam by nitrosation of cyclohexylic compounds is a well known industrial process and represents an important technological accomplishment. In particular, such processes have been developed and used by the applicant and are described in the U.S. Patent No. 3,022,291.

The nitrosation process affords caprolactam in the form of an acidic solution in which the caprolactam is chemically combined with the acid, particularly the sulfuric acid contained in the reaction mixture. Said solution is subsequently hydrolyzed and then neutralized, for example with ammonium hydroxide, to give an aqueous sulfate, particularly ammonium sulfate, solution from which the caprolactam separates as an oily phase. Said oily phase can be separated mechanically, by decantation, or it can be extracted with an organic solvent for caprolactam, such as chloroform, affording a crude caprolactam dissolved in said organic solvent. Following evaporation of the organic solvent, crude caprolactam is usually subjected to distillation.

It is well known that said crude caprolactam contains numerous impurities, and various processes have been proposed for its purification, for example the process described in the U.S. Patent No. 3,145,198. Said process consists of a sequence of treatments including at least one alkaline treatment, one distillation, one reduction and one oxidation and preferably two alkaline treatments, one reduction, one oxidation, two distillations as well as one treatment with cation exchange resins. The specific sequence and treatment conditions are described in the complete specification of the said U.S. Patent No. 3,145,198.

A more detailed study of the impurities formed during the nitrosation reaction has shown that the various impurities such as, for example, salts, insoluble bases and other solid contaminants in general, considered in the aforesaid patent granted to the applicant, contain small amounts of primary amides of the $RCONH_2$ type where R denotes a hydrocarbon radical, particularly a cyclohexyl or aliphatic radical, preferably in the $C_1$–$C_6$ range. These compounds have a certain chemical affinity for caprolactam which also is an amide-type compound and, hence, they cannot be readily separated from caprolactam. Such primary amides are referred to as "volatile bases." The separation of said volatile bases from crude caprolactam was found to be of great importance because caprolactam containing appreciable quantities of said bases cannot be used advantageously for the manufacture of synthetic linear polymers, i.e., in most common industrial end applications, particularly for the production of textile fibers.

The importance or difficulty of selectively eliminating said volatile bases from crude caprolactam has thus far probably been underestimated or at least not clearly realized. Obviously, this elimination occurs at least in part during the distillation step. Thus, it has been established that sufficiently pure caprolactam can be obtained if the purification is carried out so as to leave in the still residue a considerable amount of caprolactam which is thus lost. On the other hand, if the distillation is carried further, at least a part of said volatile bases collect in the distillate thus contaminating the caprolactam destined for commercial use.

The object of the present invention is an improved process for the purification of caprolactam which eliminates the aforesaid disadvantages and difficulties currently encountered in the production of caprolactam of satisfactory purity and which affords caprolactam containing, besides solid or other types of impurities, no appreciable or significant quantities of said volatile bases.

In particular, the object of the present invention is an improved process for the purification of caprolactam wherein said volatile bases stemming from the nitrosation reaction are treated selectively to actually eliminate them or to make their elimination possible.

Another object of the present invention is an improved process for the purification of caprolactam obtained by nitrosation of cyclohexylic compounds that can be applied advantageously to various crude products obtained during the production of said caprolactam, for example, to crude caprolactam separated after hydrolysis and neutralization of the aforementioned acid solution, in the presence of water or possibly also an organic water-immiscible solvent, for example toluene, chloroform, etc. In particular, the last cited treatment which is carried out in heterogeneous phase is particularly convenient because it makes it possible to lower the volatile base content of a nitrosation product in the presence of the solvent used to extract said caprolactam from the hydrolyzed and neutralized reaction mass.

According to another embodiment of the invention, said improved purification process can be applied also to the residues from the distillation of crude caprolactam, residues which when obtained by the previously known processes still contain from 60 to 70% of caprolactam.

In essence, the improved process according to the invention comprises subjecting said volatile bases which have an affinity for caprolactam and, hence, are difficult to separate and remove therefrom, to a selective chemical treatment so as to change their nature and eliminate or at least greatly reduce said affinity thus facilitating their separation, and then effecting the desired separation or removal under conditions thus made more favorable.

In particular, the improved process according to the invention which is designed specifically for the separation of the amide-type volatile bases from caprolactam is characterized in that the crude product containing caprolactam is treated with a halogen and an alkaline agent, in the presence of water, to convert the amide-type compounds into amines which, having a different structure from that of the amidic caprolactam, can be separated therefrom for example by known treatments with ion exchange resins.

According to one embodiment of the improved process, the aqueous solution of the crude caprolactam-containing product is treated with a stream of gaseous halogen, preferably chlorine, and then with a solution of alkali hydroxide, for example sodium hydroxide. Obviously, other halogens and other hydroxide solutions can be used, for example potassium hydroxide.

According to another embodiment of the invention, the required characteristic conditions for the treatment with a halogen and an alkaline agent are provided by use of an alkali hypohalite in the presence of water and alkaline agent, for example by treating the solution of the crude product in water or an organic solvent with an aqueous solution of sodium hypochlorite or potassium hypochlorite or similar compounds, in the presence of an alkali hydroxide.

The treatment can be effected within a wide temperature range, for example between 0° and 70° C., preferably between 10° and 20° C., and atmospheric or elevated pressure.

Several possible conditions for the application of the improved process of the invention as well as a demonstration of its essential characteristics and advantageous results will become evident from the following detailed description of a few examples of practical application of said improved process. The following method was used to determine the volatile base content of crude product subjected to the treatment according to the invention. A 60% by weight aqueous solution of crude caprolactam was prepared. An aliquot of said solution containing 20 g. of caprolactam was treated at the boil with excess sodium hydroxide solution affording $n \times 10^{-4}$ equivalents of $NH_3$. The value of "$n$" was taken as a measure of the volatile base content (V.B.C.) of caprolactam. By this standard test, the initial and final volatile base content of crude caprolactam that had been treated according to the invention were determined to illustrate the results that can be obtained by the application of the present invention In the following examples, the volatile base content will therefore be expressed by the numerical value corresponding, in each case, to the "$n$" in the relation $n \times 10^{-4}$ indicating the number of equivalents of $NH_3$ resulting from the above-described treatment of a suitable quantity of a 60% aqueous solution, or a quantity referred to 60%, containing 20 g. of caprolactam.

EXAMPLE 1

The hydrolyzed reaction product from the nitrosation of hexahydrobenzoic acid by the known process described in the earlier patents granted to the applicant was subjected to purification. Unreacted hexahydrobenzoic acid was seperated from the hydrolyzate by means of a solvent in which it is soluble, and the remaining aqueous solution was neutralized with ammonium hydroxide and extracted with chloroform. The organic solvent was evaporated and the crude caprolactam was subjected to the purification treatment according to the invention.

600 g. of crude caprolactam was dissolved in 400 cc. of distilled water affording 1000 g. of 60% aqueous caprolactam solution.

An aliquot of said solution containing 20 g. of caprolactam was used for the above-described standard test which produced $25 \times 10^{-4}$ equivalents of $NH_3$. This test indicates that the caprolactam has a volatile base content of "25."

The remaining solution of crude caprolactam was treated with a stream of gaseous chlorine for 15 minutes while keeping the temperature of the reaction mixture at about 11° C. At the end of this treatment, the pH of the mixture was adjusted to a value greater than 10 by addition of 15% aqueous sodium hydroxide solution while keeping the temperature of the mixture at about 25° C. by external cooling.

The solution treated in this manner was passed through a bed of ion exchange resin of the sulfonic type at ambient temperature to remove the amines formed during the characteristic step of the process of the invention.

As indicated by the above-described standard test, the volatile base content had decreased to 3.7. The standard volatile base content of commercial caprolactam is 0.1. This value is readily attained by subjecting the product having a volatile base content of 3.7 to further purification such as fractional distillation or fractional crystallization; on the other hand, it is highly improbable that "0.1" can be attained by subjecting a product having a volatile base content of "25" to an economically feasible number of purification processes.

EXAMPLE 2

1000 g. of a crude product obtained from the residue of a distillation of crude caprolactam and having a volatile base content of 120 was subjected to purification.

To the 1000 g. was added sufficient water to prepare a 40% by weight aqueous solution of said crude product. To this was added 500 cc. of an aqueous solution of commercial sodium hypochlorite containing excess sodium hydroxide and from 7 to 8% by weight of active chlorine. Maximum temperature during said addition was 20° C.

The aqueous solution resulting from the above-described treatment was passed through a bed of cation exchange resin, as in Example 1, to remove the amines.

The solution treated in this manner had a volatile base content of 4.1 by the above-described standard test.

EXAMPLE 3

In this example, the characteristic treatment of the invention was combined with a known purification treatment by distillation.

An 80% by weight aqueous caprolactam solution was prepared from 300 g. of crude product obtained after neutralizing an acidic caprolactam solution having a volatile base content of 14.7 by the standard test. To this solution was added 10.6 g. of gaseous chlorine with cooling to keep the temperature of the reaction mass below 25° C.

The pH of the resulting mixture was adjusted to a definitely alkaline value (pH 10) by addition of NaOH and the extracted repeatedly with $CHCl_3$. The solvent was evaporated and the caprolactam obtained was redissolved in water to prepare an 85% solution which was then passed through a column of cation exchange resin and finely dried. The resulting product was distilled in a laboratory still equipped with a 20-cm. Vigreux distillation column. The still residue from this distillation had a volatile base content of 0.1 by the previously cited standard test.

To check the extent to which the treatment of the invention had contributed to this purification of caprolactam a control run was made in which the same above indicated crude starting material was subjected to an identical treatment except that the characteristic treatment with chlorine and alkaline was omitted.

The prdouct thus treated had a volatile base content of 7.1 which makes this caprolactam unsuitable for use in polymerization.

EXAMPLE 4

The nitrosation mass obtained by the known process cited in Example 1 was hydrolyzed and the hexahydrobenzoic acid removed with a solvent (e.g., cyclohexane, toluene or benzene). The aqueous solution was made alkaline with sodium hydroxide and extracted with toluene. In this manner, a 7–8% toluene solution of caprolactam was obtained having a volatile base content of 8.

The mixture was then subjected to the treatment of the invention by vigorously agitating for one-half hour 1 kg. of said toluene solution with 30 g. of an aqueous solution containing sodium hypochlorite and sodium hydroxide.

The quantities of hypochlorite and sodium hydroxide were, respectively, 2% and 10% based on the lactam. Separating the aqueous phase and evaporating the solvent afforded a product having a volatile base content of 2.

Subsequent purification of the product can be effected by extracting the caprolactam from the toluene solution with water following the above-cited sodium hypochlorite-sodium hydroxide treatment. Evaporation of the water then affords an end product having a volatile base content of about 0.8.

What is claimed is:

1. A process for selective purification of Epsilon-caprolactam from primary amides, obtained by nitrosation of cyclohexylic compounds and containing as impurities primary amide-type volatile bases, which comprises
    dissolving the impure caprolactam in a solvent selected from the group consisting of water and organic solvents,
    subjecting the solution to treatment with an alkaline agent in the presence of water and of a product selected from the group consisting of a halogen and an alkali metal hypohalite to convert the volatile bases into amine compounds, while leaving the caprolactam in solution, and
    removing the amine compounds from the caprolactam solution.

2. A process as claimed in claim 1, wherein removal of said amine compounds is effected by subjecting the solution to action of an ion-exchange resin.

3. A process as claimed in claim 1, wherein the impure caprolactam is dissolved in water, and then
    a stream of gaseous halogen is caused to act on said solution, and then
    an alkali hydroxide is caused to act on the caproclatam.

4. A process as claimed in claim 1, wherein said alkali hypohalite is selected from the group consisting of aqueous solutions of sodium and potassium hypochlorite.

References Cited
UNITED STATES PATENTS

| | | | |
|---|---|---|---|
| 2,692,878 | 10/1954 | Kahr | 260—239.3 |
| 2,752,336 | 6/1956 | Boon et al. | 260—239.3 |
| 2,828,307 | 3/1958 | Soeterbroek et al. | 260—239.3 |
| 3,145,198 | 8/1964 | Morbidelli et al. | 260—239.3 |
| 3,406,167 | 10/1968 | Cheng et al. | 260—239.3 |

HENRY R. JILES, Primary Examiner

R. T. BOND, Assistant Examiner